Patented July 8, 1924.

1,500,378

UNITED STATES PATENT OFFICE.

VIGGO DREWSEN, OF BROOKLYN, NEW YORK, ASSIGNOR TO WEST VIRGINIA PULP AND PAPER COMPANY, OF NEW YORK, N. Y., A CORPORATION OF DELAWARE.

PROCESS OF BLEACHING FIBROUS MATERIAL.

No Drawing. Application filed October 5, 1921, Serial No. 505,622. Renewed February 2, 1923.

*To all whom it may concern:*

Be it known that I, VIGGO DREWSEN, a citizen of the United States, and resident of the borough of Brooklyn, county of Kings, city and State of New York, have made certain new and useful Improvements Relating to Processes of Bleaching Fibrous Material, of which the following is a specification.

This application is a partial continuation of the co-pending Drewsen application, Serial No. 474,970, filed June 4, 1921, that is, it contains subject matter taken therefrom.

This invention relates especially to processes of bleaching vegetable fibre material such as wood, straw, flax, corn stalk, bagasse, hemp, jute and other suitable fibrous material which has been cooked and refined by boiling for eight to ten hours under pressure of 100 pounds or so in strong solutions of suitable soluble monosulphite such as sodium, potassium or magnesium monosulphites, so as to dissolve or remove the lignin and other connecting material and render the individual fibres separable. The resulting fibre, which seems to be stronger than is procurable by the sulphite or soda processes, can be very effectively bleached by bleaching powder, etc., after a preliminary chlorine gas or chlorine liquor treatment which effects the combination of the free chlorine with some components of the fibrous material which seem to comprise an unsaturated or side linkage with which the chlorine combines; since the liquor remains neutral during this chlorination treatment without the usual decided production of hydrochloric acid, and since the chlorine derivative thus formed is very readily soluble in both hot and cold water, so that it may be readily and completely removed by washing the fibre with hot water for instance. After this chlorination treatment, the fibre may be further bleached by any suitable agents such, for instance, as a few per cent of bleaching powder which, with two or three per cent of 37% bleach, gives a brilliant white pulp with monosulphite fibre produced from wood, straw, or other material.

In carrying out this preliminary chlorine bleaching treatment, for example, the washed wood or other vegetable fibre from the monosulphite digester, preferably when suspended in water so as to form about a three per cent pulp mixture which can be readily pumped, may be treated with chlorine gas or chlorine water. This wet pulp may be pumped or circulated through a tower or other percolating or contact system through which chlorine gas may be run in an opposite direction to secure the desired absorption and combination of the chlorine with the fibre or pulp. When the chlorine is no longer absorbed because of the completion of this chlorination action which promptly takes place, the wet pulp may be pumped to a further washing vat for such further hot water or other washing, and if desired the after-bleaching treatment indicated, although after-bleaching of the chlorinated fibre is unnecessary for many uses.

This invention has been described in connection with a number of illustrative materials, proportions, apparatus, conditions, temperatures, times of treatment and methods of use to the details of which disclosure the invention is not of course to be limited, since what is claimed as new and what is desired to be covered by Letters Patent is set forth in the appended claims:

1. The process of bleaching wood fibre cellulose material that has been produced by the digestion of raw vegetable fibre with soluble monosulphite solution, which comprises treating the washed fibre while suspended in water with chlorine and simultaneously agitating the same, washing out the chlorination product thus formed and further bleaching the fibre with bleaching powder as an after-bleach.

2. The process of bleaching cellulose material that has been produced by the digestion of raw vegetable fibre with soluble monosulphite solution, which comprises treating the washed fibre with chlorine, washing out the chlorination product thus formed and further bleaching the fibre with an after-bleach.

3. The process of treating wood fibre cellulose material that has been produced by the digestion of raw vegetable fibre with soluble monosulphite solution, which comprises treating the washed fibre while suspended in water with a chlorine solution and simultaneously agitating the same, and washing out the chlorination product thus formed.

4. The process of treating cellulose material that has been produced by the digestion of raw vegetable fibre with soluble monosulphite solution, which comprises treating the fibre with a chlorine solution and washing out the chlorination product thus formed.

5. The process of producing wood or other vegetable fibre cellulose material which comprises digesting the raw vegetable fibre with soluble monosulphite solution to dissolve or remove the lignine and other connecting material, washing out such lignine material, treating the disintegrated fibre with chlorine in the presence of water and simultaneously agitating the same to effect chlorination of incorporated coloring material without production of substantial amounts of free hydrochloric acid, washing out the chlorination product thus formed and further bleaching the fibre with an after-bleach.

6. The process of producing wood or other vegetable fibre cellulose material which comprises digesting the raw vegetable fibre with soluble monosulphite solution to dissolve or remove the lignine and other connecting material, washing out such lignine material, treating the disintegrated fibre with chlorine in the presence of water to effect chlorination of incorporated coloring material and washing out the chlorination product thus formed.

7. The process of producing wood fibre material which comprises digesting and disintegrating the raw vegetable fibre dissolving or removing the lignine material, washing out such lignine material, treating the disintegrated fibre with chlorine in the presence of water to effect chlorination of incorporated coloring material without production of substantial amounts of free hydrochloric acid, washing out the chlorination product thus formed and further bleaching the fibre with an after-bleach.

VIGGO DREWSEN.